UNITED STATES PATENT OFFICE.

PETER SCHWIND, OF LE MARS, IOWA.

BITTERS.

SPECIFICATION forming part of Letters Patent No. 327,603, dated October 6, 1885.

Application filed April 17, 1885. Serial No. 162,558. (No specimens.)

*To all whom it may concern:*

Be it known that I, PETER SCHWIND, a citizen of the United States, residing at the city of Le Mars, in the county of Plymouth and State of Iowa, have invented and discovered a new and useful composition of matter to be used as a medicine for the treatment of disease, of which the following is a specification.

My composition consists of the following ingredients, compounded and combined in the proportions and manner herein stated, viz: pure water, one gallon; bay-leaves, (*Myrica cerifera*,) one ounce; juniper-berries, (*Juniperus communis*,) two ounces; nutmeg-blossoms, (*Nux moschata*,) one ounce; French saffron, (*Carthamus tinctorius*,) two drams; cinnamon, four drams; masterwort-root, (*Heracleum lanatum*,) two ounces; sweet-flag root, (*Calamus aromaticus*,) two ounces, prepared as follows, viz: Place the above composition of matter in a copper kettle, and steep over a slow fire until the quantity of liquor is reduced to one-half gallon. Then add one-half gallon of pure proof whisky. Then let the composition stand three days. Strain through a flannel cloth, and the bitters are ripe for use, to be taken internally, a wineglassful three times each day—morning, noon, and night.

What I claim, and desire to secure by Letters Patent of the United States, is—

The herein-described composition of matter to be used as a medicine for the treatment of disease and as a tonic, consisting of water, whisky, bay-leaves, juniper-berries, nutmeg-blossoms, French saffron, cinnamon, masterwort-root, and sweet-flag, in the proportions specified.

PETER SCHWIND.

Witnesses:
W. A. SIMKINS,
W. S. GLODEN.